United States Patent
Meister et al.

(10) Patent No.: US 8,157,897 B2
(45) Date of Patent: *Apr. 17, 2012

(54) FILTER PURGE SYSTEM UTILIZING IMPACT WAVE GENERATING DEVICE AND VACUUM SOURCE

(75) Inventors: Steven Francis Meister, Chillicothe, IL (US); David Wayne Painter, Wyoming, IL (US); Jamie Erin Frisch, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 924 days.

This patent is subject to a terminal disclaimer.

(21) Appl. No.: 11/819,873

(22) Filed: Jun. 29, 2007

(65) Prior Publication Data

US 2009/0000477 A1      Jan. 1, 2009

(51) Int. Cl.
  *B01D 53/00* (2006.01)
(52) U.S. Cl. ............... 95/279; 95/278; 55/292; 55/283; 55/302; 55/305; 55/DIG. 30
(58) Field of Classification Search .............. 55/292, 55/283, 302, 304–305, DIG. 30; 95/279, 95/278; 96/241, 246, 253; 134/17; 60/311, 60/286, 295–297
See application file for complete search history.

(56) References Cited

U.S. PATENT DOCUMENTS

| | | | |
|---|---|---|---|
| 3,213,804 A | 10/1965 | Sobey | |
| 3,887,341 A | 6/1975 | Sutter | |
| 4,502,278 A | 3/1985 | Stark | |
| 4,509,961 A * | 4/1985 | Jones | 55/294 |
| 4,624,689 A * | 11/1986 | Volk et al. | 96/397 |
| 4,655,799 A | 4/1987 | Bosworth et al. | |
| 4,730,454 A | 3/1988 | Pischinger et al. | |
| 4,833,883 A | 5/1989 | Oda et al. | |
| 4,875,335 A | 10/1989 | Arai et al. | |
| 4,875,336 A | 10/1989 | Hayashi et al. | |
| 4,992,021 A * | 2/1991 | Langen et al. | 415/52.1 |
| 5,397,550 A | 3/1995 | Marino, Jr. | |
| 5,421,845 A | 6/1995 | Gregg et al. | |
| 5,616,171 A | 4/1997 | Barris et al. | |
| 5,634,952 A | 6/1997 | Kasai et al. | |
| 5,701,735 A | 12/1997 | Kawaguchi | |
| 5,711,234 A | 1/1998 | Uhlemann et al. | |
| 5,725,618 A * | 3/1998 | Shimoda et al. | 55/283 |
| 6,010,547 A | 1/2000 | Jeong et al. | |
| 6,037,291 A | 3/2000 | Buckley et al. | |
| 6,497,095 B2 | 12/2002 | Carberry et al. | |
| 6,565,636 B1 * | 5/2003 | Thompson | 96/241 |
| 6,641,646 B2 | 11/2003 | Rosenberg | |
| 6,755,016 B2 | 6/2004 | Dittler et al. | |
| 6,835,224 B2 | 12/2004 | Cheng | |

(Continued)

FOREIGN PATENT DOCUMENTS

DE       3808075       9/1989

(Continued)

OTHER PUBLICATIONS

Office Action in U.S. Appl. No. 11/819,878 dated Apr. 1, 2010. Office Action mailed Oct. 26, 2010 in U.S. Appl. No. 11/819,878.

*Primary Examiner* — Jason M Greene
*Assistant Examiner* — Karla Hawkins

(57) ABSTRACT

A system for removing matter from a filtering device is disclosed. The system may have an impact wave generating device. The system may further have a vacuum source to draw matter away from the filtering device.

20 Claims, 3 Drawing Sheets

U.S. PATENT DOCUMENTS

| | | |
|---|---|---|
| 7,025,811 B2 | 4/2006 | Streichsbier et al. |
| 7,047,731 B2 | 5/2006 | Foster et al. |
| 2004/0112218 A1 | 6/2004 | Steiner |
| 2004/0226290 A1 | 11/2004 | Bailey |
| 2006/0070359 A1 | 4/2006 | Sellers et al. |
| 2007/0000520 A1 | 1/2007 | Steen et al. |
| 2007/0137150 A1 | 6/2007 | Goddard |
| 2008/0092525 A1* | 4/2008 | Ehlers .............................. 60/286 |

FOREIGN PATENT DOCUMENTS

| | | |
|---|---|---|
| EP | 0220588 | 5/1987 |
| EP | 0 930 422 A1 | 7/1999 |
| EP | 1 698 765 A1 | 9/2006 |
| JP | 4-31613 | 2/1992 |
| JP | 7-54632 | 2/1995 |
| JP | 7-63038 | 3/1995 |
| WO | WO 2007/061680 * | 5/2007 |

* cited by examiner

FILTER PURGE SYSTEM UTILIZING IMPACT WAVE GENERATING DEVICE AND VACUUM SOURCE

TECHNICAL FIELD

The present disclosure relates generally to a system for purging a filter, and more particularly, to a purge system that uses an impact wave generating device and a vacuum source to remove matter from the filter.

BACKGROUND

Internal combustion engines, including diesel engines, gasoline engines, gaseous fuel-powered, and other engines known in the art exhaust a complex mixture of air pollutants. The air pollutants may be composed of gaseous compounds, as well as solid particulate matter. Due to increased attention on the environment, exhaust emission standards have become more stringent, and the amount of gaseous compounds and particulate matter emitted to the atmosphere from an engine may be regulated depending on the type of engine, size of engine, and/or class of engine.

One method that has been implemented by engine manufacturers to comply with the regulation of air pollutants exhausted to the environment has been to remove these pollutants from the exhaust flow of an engine with filters. However, extended use and repeated regeneration of such filters may cause matter to build up in the filters, thereby reducing filter functionality and engine performance.

U.S. Pat. No. 5,725,618 (the '618 patent) issued to Shimoda on Mar. 10, 1998 discloses a system for removing particulate matter from an engine filter. In particular, the '618 patent discloses a particulate filter connected to an engine exhaust line, and an impact air valve structure located within the exhaust line and downstream of the particulate filter. When the particulate filter is clogged with accumulated particulates, an impact wave is generated by instantly releasing air fed to a pressure accumulating chamber of the impact air valve. When the impact wave is transferred to a downstream face of the particulate filter in a reverse flow direction, it removes captured particulates from the filter. Following removal of the particulates, the particulates may be burned away upstream of the filter. In this manner, the '618 patent may remove particulate matter from a cross-section of the filter.

Although the system of the '618 patent may improve the amount of particulate matter dislodged from a filter, the system requires an impact air valve in order to generate the reverse moving wave. The impact air valve increases the overall cost and size of the system. Furthermore, the method of burning dislodged matter may be an ineffective means for eliminating some types of particulate matter, such as ash, which does not burn. As a result, the dislodged particulate matter may accumulate at the inlet of the filter and may reclog the filter when the flow returns to the normal direction.

The present disclosure is directed to overcoming one or more of the problems set forth above.

SUMMARY OF THE INVENTION

In one aspect, the present disclosure is directed to a system for removing matter from a filtering device. The system includes an impact wave generating device located downstream of the filtering device. The system further includes a vacuum source located upstream of the filtering device.

In another aspect, the present disclosure is directed toward a method of removing matter from a filtering device. The method includes generating an impact wave and directing the impact wave through the filtering device. The method further includes creating a vacuum to collect matter released from the filtering device by the impact wave.

DETAILED DESCRIPTION

Figure 1:
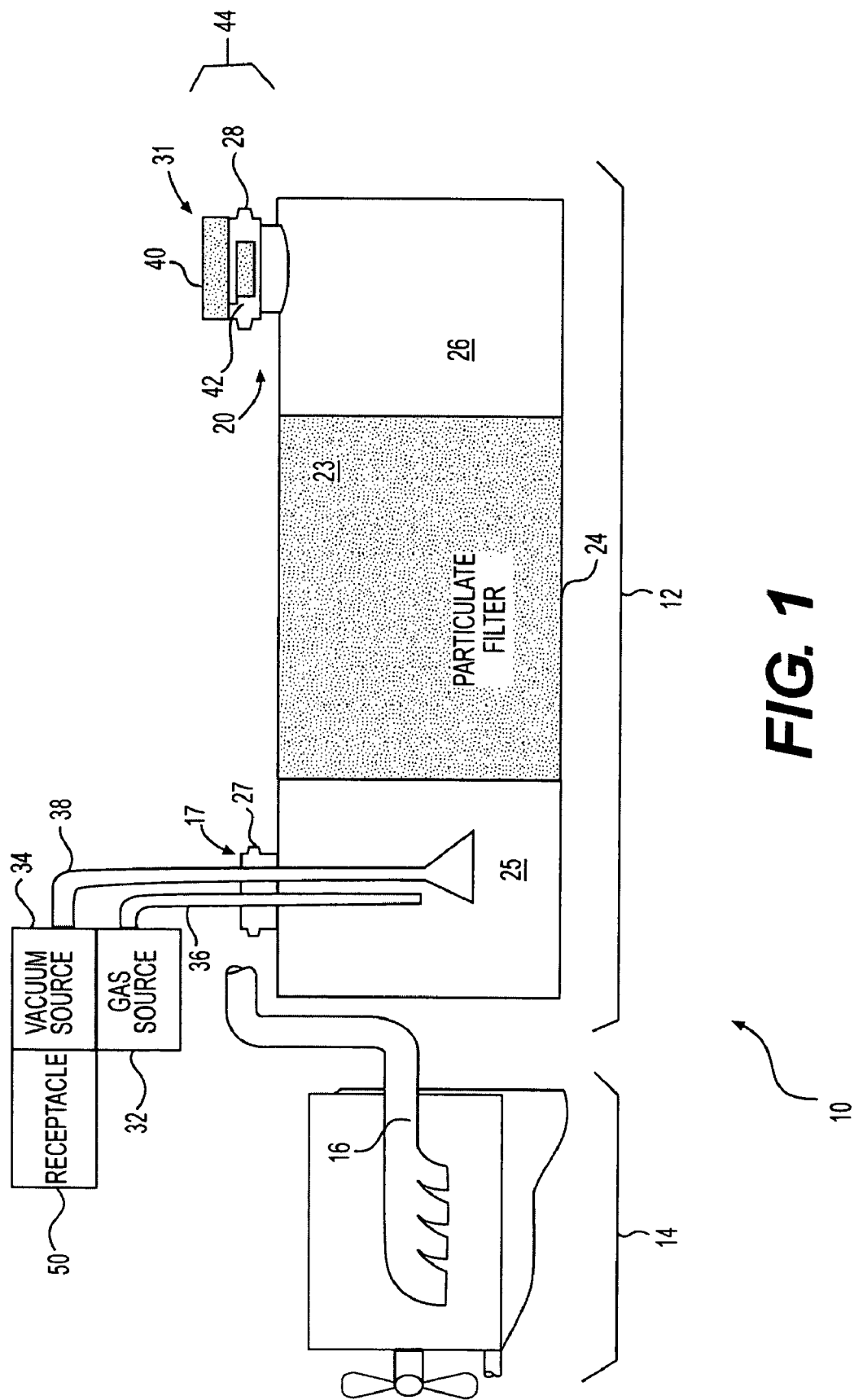
FIG. 1 is a diagrammatic illustration of an exemplary disclosed power system.
Figure 2:
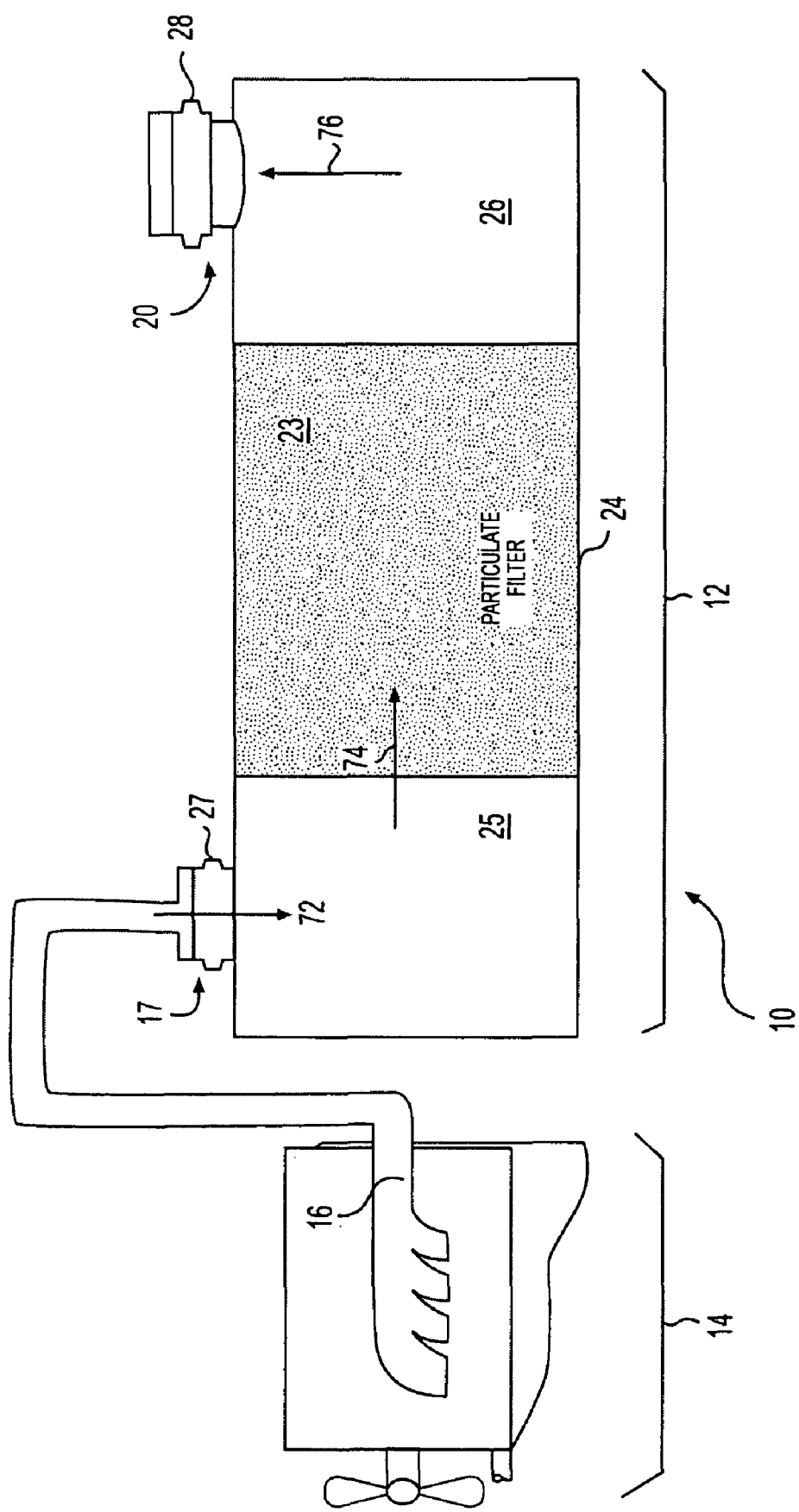
FIG. 2 is a diagrammatic illustration of an exemplary disclosed filter system associated with the power system of FIG. 1.

FIG. 1 illustrates an exemplary embodiment of a power system 10. In some embodiments of the present disclosure, power system 10 may include a filter purge system 12 connected to an internal combustion engine 14 such as, for example, a diesel engine. Engine 14 may include an exhaust line 16 connecting an exhaust flow of engine 14 with an inlet 17 of filter purge system 12 (as shown in FIG. 2). Engine 14 may also include a turbine (not shown) connected to exhaust line 16. In such an embodiment, inlet 17 of filter purge system 12 may be connected to an outlet of the turbine.

Referring again to FIG. 1, exhaust line 16 may be removably attached to inlet 17 and may be uncoupled from inlet 17 during operation of filter purge system 12, to prohibit dislodged matter from flowing back into engine 14. It is further considered that an inlet valve (not shown) may be disposed within exhaust line 16 of engine 14 and upstream of inlet 17. The inlet valve may selectively allow an exhaust flow of engine 14 to pass through filter purge system 12. During operation of filter purge system 12, the inlet valve may block communication between engine 14 and filter purge system 12. In such an embodiment, it is considered that exhaust line 16 may remain coupled to inlet 17.

Referring to FIG. 2, filter purge system 12 may further include an outlet 20 disposed in the downstream end of filter purge system 12. Outlet 20 may allow the exhaust flow to pass to from filter purge system 12 substantially unrestricted.

Filter media 23 may be fabricated from, for example, a cordierite, sintered metal, or silicon carbide material or any other material known in the art. In some embodiments of the present disclosure, filter media 23 may be coated with or otherwise contain a catalyst capable of reducing or converting soot, NOx, sulfur compounds, particulate matter and/or other pollutants known in the art to innocuous substances. Such catalyst materials may include, for example, alumina, platinum, rhodium, barium, cerium, and/or alkali metals, alkaline-earth metals, rare-earth metals, or combinations thereof. Filter media 23 may be formed into a honeycomb structure, a mesh structure, or any other structural configuration to maximize a surface area available for the filtering of material (i.e. particulate matter).

Filter purge system 12 may also include a filter housing 24 configured to contain and support filter media 23. An inlet end cap 25 of filter housing 24 may be defined as the portion of filter housing 24 located upstream of filter media 23 to receive a flow of exhaust. An outlet end cap 26 of filter housing 24 may be defined as the portion of filter housing 24 located downstream of filter media 23 to discharge the flow of exhaust. It is further considered that inlet end cap 25 and outlet end cap 26 may embody any structural components of filter housing 24 disposed on opposite sides of filter media 23.

Inlet end cap 25 and outlet end cap 26 may include flanges 27 and 28, respectively. As shown in FIG. 2, during normal operation of engine 14, exhaust line 16 may be mechanically attached to flange 27 by, for example, threaded fastening.

One or more sensors (not shown) may be disposed within outlet end cap 26 and/or internal to filter purge system 12. The sensor may embody any sensing device known in the art such as, for example, a flow meter, an emission sensor (i.e. a NOx sensor), a temperature sensor, a pressure transducer, or other sensor. The sensor may sense, for example, an increase in the pressure drop across filter media 23, indicating a saturation of filter media 23. The sensor may send a signal indicative of the pressure drop to a controller or other device (not shown), and may assist in, for example, triggering filter regeneration and/or operation of filter purge system 12. It is further considered that one or more sensors may be located upstream of filter media 23.

Figure 3:
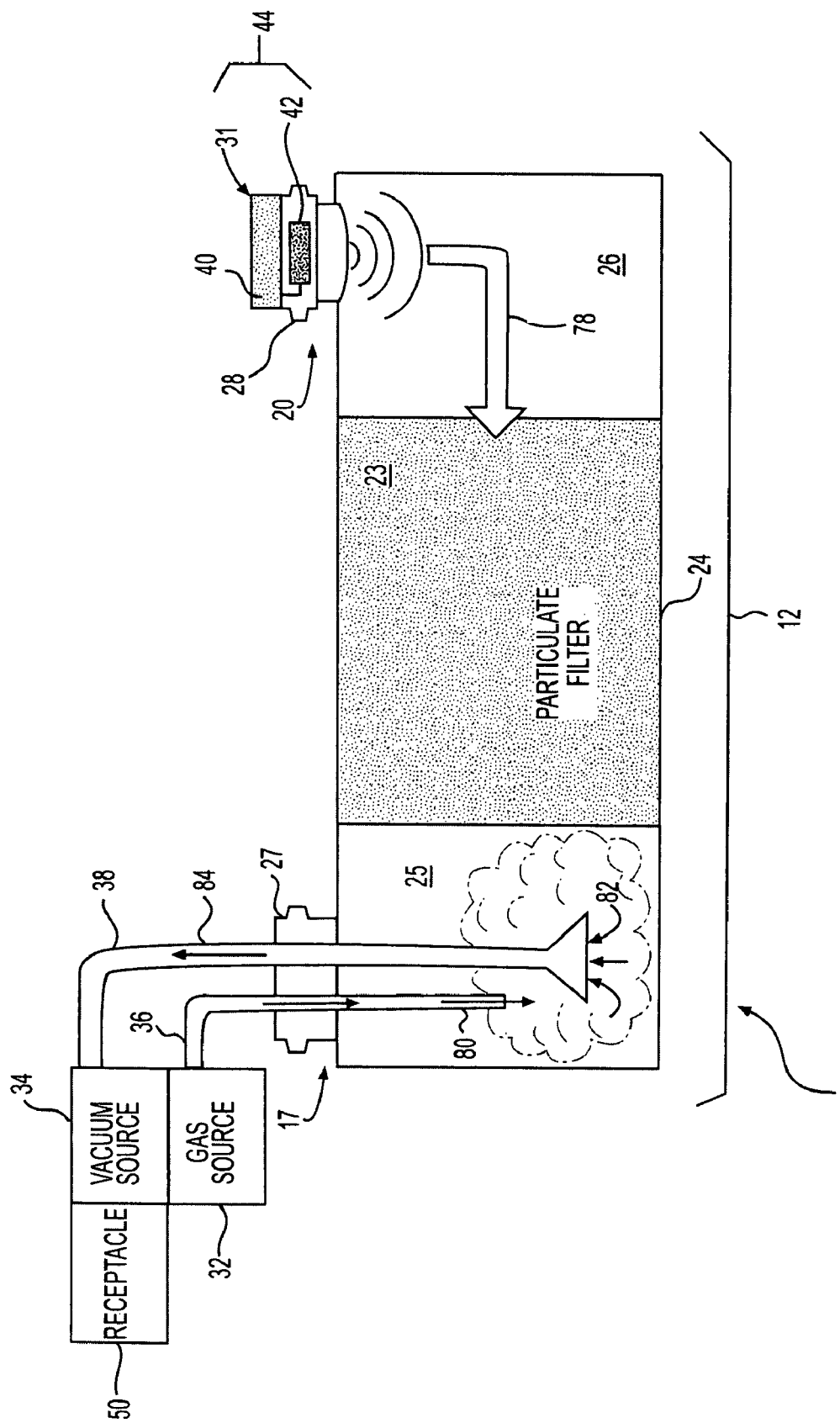
FIG. 3 is another diagrammatic illustration of the exemplary disclosed filter purge system of FIG. 2.

Referring to FIG. 3, filter purge system 12 may include a propellant arrangement 31 connected to outlet end cap 26. Filter purge system 12 may further include a gas source 32 and a vacuum source 34 connected to inlet end cap 25 via a gas line 36 and a vacuum line 38, respectively.

Propellant arrangement 31 may be mechanically attached to flange 28 by any means such as, for example, by threaded fastening. Propellant arrangement 31 may include a propellant 40 and an igniter 42 contained, for example, in a single cartridge 44 with a single ignition point. Propellant 40 may embody a solid such as guanylurea dinitramide ($C_2H_7N_7O_5$ also referred to GUDN) or a combustible gas such as propane. The ignition of propellant 40 may result in an impact wave (i.e. a fast moving wave of gas). It is considered that igniter 42 may be any a device that provides an electrical spark to propellant 40. It is further considered that a timing device (not shown) may control igniter 42 and may be used to trigger multiple combustion events of propellant 40. For example, the timing device may trigger igniter 42 to initiate reactions of propellant 40 at intervals of about 100 ms. The interval between reactions may vary and may be dependant upon the geometry of filter purge system 12. The quantity and geometry of propellant 40 may be controlled to achieve a reaction that results in an impact wave with a mass flow rate of for example, about 15 kg/sec and a duration of at least about 10 ms. The interval between reactions, duration of the impact wave, and the mass flow rate may be dependant upon the quantity of and geometry of propellant 40, as well as the geometry of filter purge system 12. It is further considered that propellant arrangement 31 may be attached for removal such that propellant 40 may be replenished, as required.

Gas source 32 of filter purge system 12 may be fluidly connected to inlet end cap 25 by gas line 36. Gas source 32 may include, for example, an air compressor, an accumulator, or any other device capable of delivering a flow of compressed gas through gas line 36 at up to approximately 100 psi. Gas source 32 may deliver the gas in a pulsed flow, a uniform flow, or some combination thereof. The gas may be any gas known in the art useful in agitating ash or other matter such as, for example, air, oxygen, hydrogen, nitrogen, or helium. Gas line 36 may be attached to flange 27 by any conventional means, such as, for example, by adhesives, a compression collar, matching sets of threads, quick connects, or snap fits.

Vacuum source 34 may be connected to inlet end cap 25 by vacuum line 38. Vacuum source 34 may also be fluidly connected at an opposing end to a collection receptacle 50. Vacuum source 34 may include, for example, a vacuum pump, or any other device capable of creating negative pressure within inlet end cap 25. Vacuum source 34 may be of any power or capacity useful in removing agitated matter from inlet end cap 25, and its size may be limited by the size and/or type of filter media 23 being cleaned and/or the sensitivity of other downstream components. Vacuum source 34 may have a maximum capacity that is up to approximately 14 psi of vacuum.

As shown in FIG. 1, vacuum line 38 may connect the vacuum source 34 to inlet end cap 25. This fluid connection may allow solid, liquid, or gas matter released from filter media 23 to pass from filter purge system 12 to vacuum source 34 and/or to receptacle 50. Vacuum line 38 may be attached to flange 27 in a manner similar to that of gas line 36.

Receptacle 50 may be fluidly connected to vacuum source 34. Receptacle 50 may be configured to collect matter removed from filter purge system 12, and may be removably attached to vacuum source 34. For example, in some embodiments, as vacuum source 34 draws matter from filter purge system 12, the removed matter may pass through a vacuum filter internal to the vacuum source (not shown). In such embodiments, receptacle 50 may collect and store the matter collected by the vacuum filter. Receptacle 50 may be any size useful in collecting the matter removed from the filter purge system 12, and may have any useful capacity and shape. For example, receptacle 50 may be cylindrical or box shaped, and may be a rigid container or a flexible bag. Receptacle 50 may be designed to collect and store matter of any type or composition. In one embodiment of the present disclosure, receptacle 50 may be designed to store material, such as, for example, ash, and may be made of, for example, steel, tin, reinforced cloth, paper, plastic, aluminum, composites, ceramics, or any other material known in the art. Receptacle 50 may be rapidly disconnected and reconnected to vacuum source 34 to facilitate disposal of the matter collected therein.

FIGS. 2 and 3 illustrate flow arrangements of filter purge system 12 and will be discussed in detail in the next section.

INDUSTRIAL APPLICABILITY

The disclosed filter purge system may be used with any filtering device and combustion source known in the art. The filtering device may be used, for example, to remove particulate matter from a flow of exhaust exiting the combustion source. The disclosed filter purge system may be located on-board of the engine or furnace and may remove particulate matter captured within the filtering device. The operation of filter purge system 12 will now be explained in detail.

A variety of different methods and systems may be used to remove matter from a filtering device. For example, some filter devices may be cleaned through regeneration. During regeneration, a heat source may be used to increase the temperature of the filter device to combustion or oxidation levels. The heat source may also increase the temperature of particulate matter trapped in the filtering device above a combustion or oxidation temperature of the particulate matter, thereby burning away most of the collected particulate matter and regenerating the filter. Although regeneration may reduce the buildup of particulate matter within the filter, regeneration, does not remove all particulate matter. Remaining particulate matter, or ash, may become trapped in the filter system and may gradually build up and plug the filter device over time, and result in deterioration in filtering performance. Thus, in some situations, it is necessary to remove built-up ash from the filter device using other techniques and systems.

Referring to FIG. 2, under normal engine operation, exhaust line 16 may be coupled to inlet 17 to facilitate passage of an exhaust flow from the engine 14. As illustrated by a flow arrow 72, the exhaust flow may exit engine 14, and pass through exhaust line 16. From exhaust line 16, the exhaust flow may enter filter purge system 12 through inlet 17 and travel through at least a portion of filter media 23, as illustrated by a flow arrow 74. The exhaust flow may pass through outlet 20, as shown by a flow arrow 76.

Over time, a sensor may sense an increase in the pressure drop across filter media 23, indicating a saturation of filter media 23. Based on these readings, filter purge system 12 may undergo regeneration either automatically, or as a result of some operator input. As described above, the regeneration process may not remove all the matter entrained in filter media 23, and ash may build up in filter media 23. Filter purge system 12 of the present disclosure may be activated to assist in removing the ash collected within filter media 23. It is understood that filter purge system 12 may also be used to assist in the removal of soot and/or other matter collected within the filter media 23.

Referring to FIG. 3, to begin the removal of ash from filter purge system 12, engine 14 (referring to FIG. 1) may be turned off such that combustion ceases and substantially no exhaust flows from engine 14 to exhaust line 16. Exhaust line 16 may be uncoupled from flange 27. Propellant arrangement 31 may be attached to flange 28, and gas line 36 and vacuum line 38 may be attached to flange 27. Gas source 32 may be activated and may begin to supply compressed air to inlet end cap 25, as shown by a flow arrow 80. Vacuum source 34 may be activated at substantially the same time as gas source 32, and may draw a vacuum or generate negative pressure in inlet end cap 25, as shown by flow arrows 82.

Propellant arrangement 31 may be activated and ignition source 42 may ignite a solid or gas propellant 40 in order to initiate an oxidation reaction thereof. The reaction may result an impact wave (i.e. a burst of gas), with an adequate mass flow rate and duration to remove matter entrained within filter media 23. The duration and force of the impact wave may be dependant on the geometry of filter 24. The impact wave may, for example have a mass flow rate of about 15 kg/s and a duration of at least about 10 ms. The impact wave may be directed through filter media 23 in the direction indicated by a flow arrow 78 and result in a pressure drop of approximately 5-7 psi through filter media 23. As the impact wave travels through filter media 23, entrained particulate matter may be dislodged from filter media 23 and blown into inlet end cap 25. It is considered that substantially all of the energy of the impact wave may be consumed by the passage of the wave through filter media 23. Following the first reaction of propellant 40, ignition source 42 may initiate further reaction events at intervals of approximately 100 ms until substantially all the entrained particulate matter has been removed from filter media 23. It is further considered that a single ignition event of ignition source 42 may initiate a chain of impact wave-generating reactions of solid propellant 40, until substantially all of solid propellant 40 has been consumed.

Once ash is broken free of filter media 23, the compressed flow of gas source 32 may agitate the ash and make it airborne. The agitated matter may be drawn out of inlet end cap 25 by vacuum source 34, as shown by flow arrows 82. The combination of compressed air and vacuum may improve the ash removal capabilities of filter purge system 12 and may be useful in removing ash deposited in areas of inlet end cap 25 otherwise difficult to reach. The ash may be safely stored within receptacle 50 throughout the ash removal process, and may reside in the receptacle 50 until disposal.

The sensor may be used to determine whether filter media 23 is substantially free of ash. For example, after operation of filter purge system 12, propellant arrangement 31, gas source 32, and vacuum source 34 may be removed; exhaust line 16 may be coupled to flanges 27; and engine 14 may be started. The sensor may detect the pressure drop across filter media 23 and determine whether filter media 23 is operating under substantially ash-free conditions or whether filter media 23 requires further service.

Other embodiments of the disclosed service system will be apparent to those skilled in the art from consideration of the specification. For example, it is considered that filter media 23 may be purged during operation of engine 14, if desired. In addition, filter purge system 12 may be fitted with more than one propellant arrangement 31, gas source 32, and/or vacuum source 34. Furthermore, gas source 32 and vacuum source 34 may be the same device, if desired. It is also considered that propellant 40 may embody a compressed gas source and that, in such an embodiment, igniter 42 may be omitted.

Several advantages may be associated with the disclosed system for removing matter from a filter. Specifically, the disclosed system method may use readily available solid or gas propellant to create an impact wave that may remove entrained matter from a filter. The impact wave generated by the propellant may be distributed evenly across the filter such that the system may dislodge substantially all the matter entrained within the filter. Furthermore, the disclosed system may remove the dislodged matter without the need for large and costly valve systems. In addition, the disclosed system may remove matter, such as ash, that may not be eliminated by burning or regeneration.

It will be apparent to those skilled in the art that various modifications and variations can be made to the disclosed filter purge system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A filter purge system, comprising:
   a filter media;
   an impact wave generating device located downstream of the filter media;
   a vacuum source located upstream of the filtering media; and
   a compressed gas source located upstream of the filter media, wherein the compressed gas source is configured to agitate matter released from the filter media by an impact wave from the impact wave generating device.

2. The system of claim 1, wherein the impact wave generating device includes a propellant and an igniter configured to ignite the propellant.

3. The system of claim 1, further including a receptacle.

4. The system of claim 3, wherein the receptacle is configured to receive matter captured by the vacuum source.

5. The system of claim 1, wherein the vacuum source is configured to capture the agitated matter.

6. The system of claim 1, wherein the compressed gas source is configured to supply compressed gas up to approximately 100 psi.

7. The system of claim 1, wherein the vacuum source is configured to supply a vacuum of approximately 8-14 psi.

8. The system of claim 1, further including a housing that contains the filter media and the impact wave generating device, the impact wave generating device being removably located downstream of the filter media.

9. The system of claim 8, further including a removable cap configured to seal the housing when the impact wave generating device is uncoupled from the housing.

10. The system of claim 8, wherein the vacuum source is removably attached to the housing.

11. The system of claim 10, further including a removable cap configured to seal the housing when the vacuum source is uncoupled from the housing.

12. The system of claim 11, further including a removable cap configured to seal the housing when the impact wave generating device is uncoupled from the housing.

13. A method for cleaning a filtering device having a filter media comprising:
generating an impact wave;
directing the impact wave through the filter media;
using a vacuum source to withdraw from the filtering device matter dislodged from an entire surface of the filter media by the impact wave; and
using a compressed gas source upstream of the filter media to agitate the matter dislodged from the filter media for withdrawal with the vacuum source.

14. The method of claim 13, wherein generating includes igniting a propellant.

15. The method of claim 13, wherein using the compressed gas source upstream of the filter media to agitate the matter dislodged from the filter media for withdrawal with the vacuum source includes agitating with a compressed gas source of up to approximately 10 psi.

16. The method of claim 13, wherein using a vacuum source to withdraw from the filtering device matter dislodged from an entire surface of the filter media by the impact wave includes creating a vacuum of approximately 10-14 psi.

17. An exhaust treatment system comprising:
an engine configured to produce power and a flow of exhaust;
a filter media situated to receive the flow of exhaust from the engine;
a propellant located downstream of the filter media and an igniter configured to ignite the propellant to generate an impact wave that dislodges matter from the particulate filter;
a vacuum source configured to draw the dislodged matter away from the filter media; and
a compressed gas source located upstream of the filter media and configured to agitate matter released from the filter media.

18. The filter purge system of claim 1, wherein the compressed gas source includes at least one of an air compressor or an accumulator.

19. The method of claim 13, wherein the compressed gas source includes at least one of an air compressor or an accumulator.

20. The exhaust treatment system of claim 17, wherein the compressed gas source includes at least one of an air compressor or an accumulator.

* * * * *